Jan. 20, 1970 LEROY J. HERBON 3,490,518
SINGLE KNOB AIR CONDITIONING CONTROL DEVICE
Filed Sept. 25, 1968 2 Sheets-Sheet 2
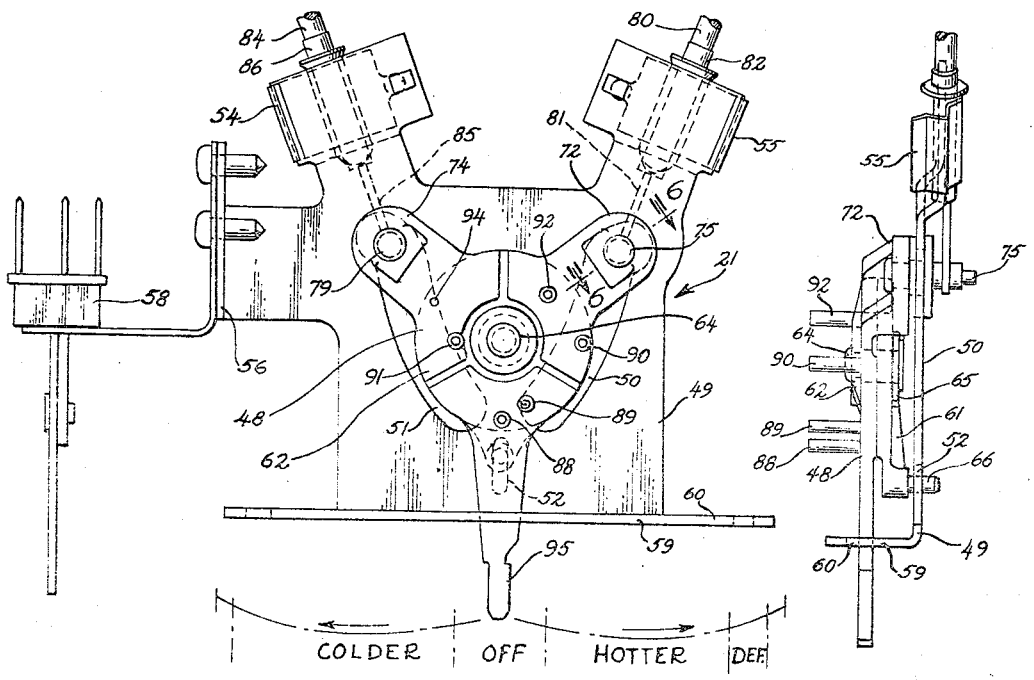
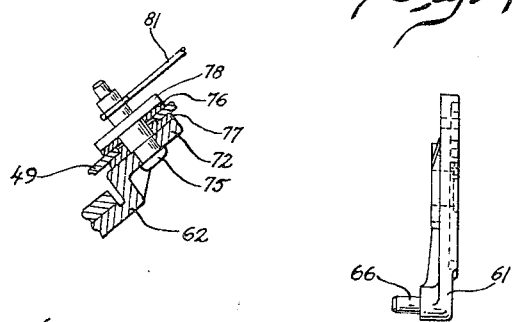
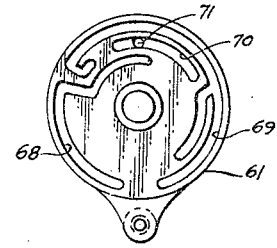
INVENTOR,
LEROY J. HERBON
BY
ATTORNEYS

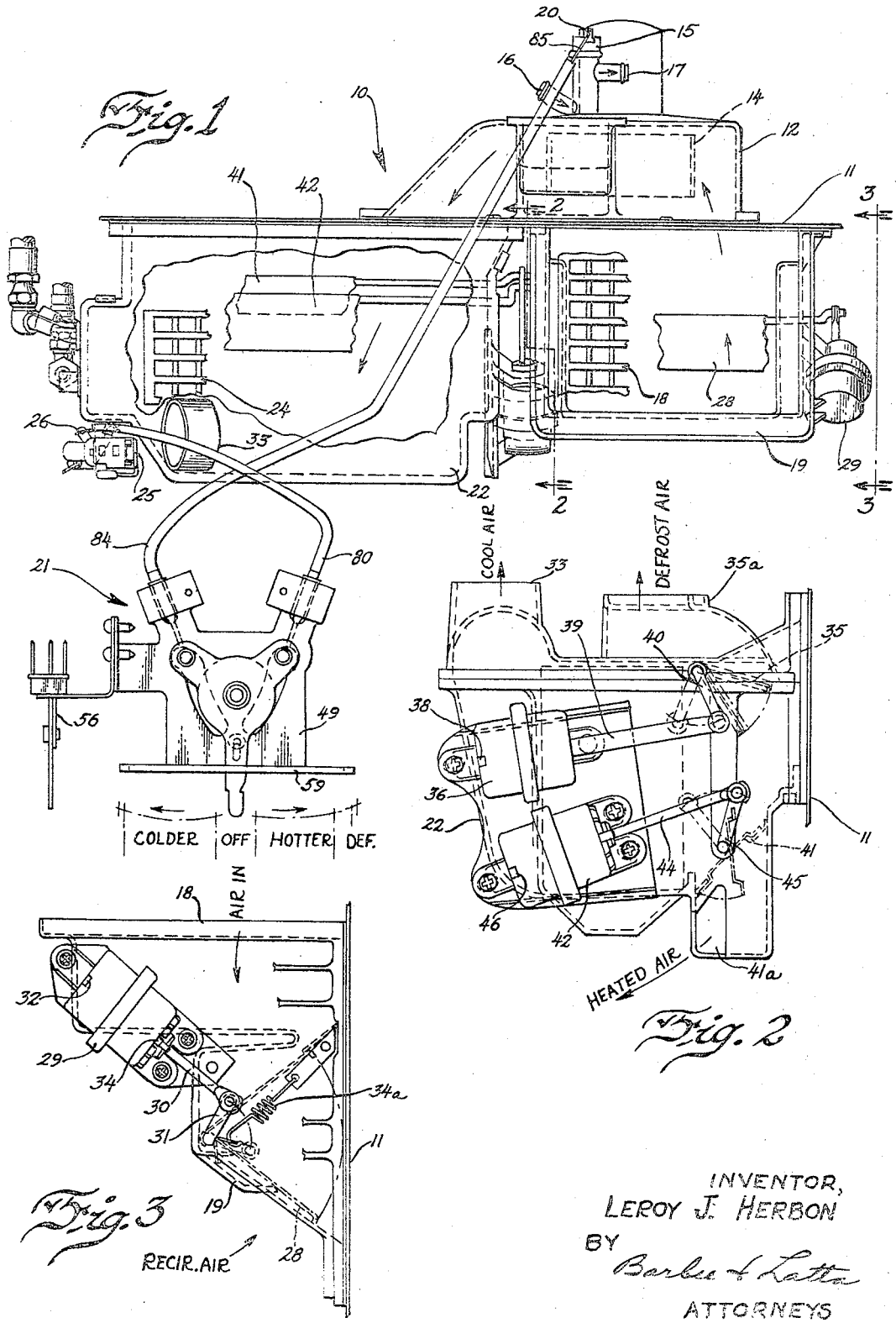

United States Patent Office 3,490,518
Patented Jan. 20, 1970

3,490,518
SINGLE KNOB AIR CONDITIONING CONTROL DEVICE
Leroy J. Herbon, South Lyon, Mich., assignor to American Motors Corporation, Kenosha, Wis., a corporation of Maryland
Filed Sept. 25, 1968, Ser. No. 762,396
Int. Cl. B60h 3/00; F17d 3/00; F28f 27/00
U.S. Cl. 165—42                                                10 Claims

ABSTRACT OF THE DISCLOSURE

A single knob control device constructed to provide selective, graduated control of the heating and the cooling media of an automotive air conditioning system by the use of a slotted mounting arrangement and incorporating a valve therein for the suitable positioning of the various air dampers of the system.

BACKGROUND OF THE INVENTION

Field of the invention

This invention pertains to control devices for automotive air conditioning systems.

Description of the prior art

The conventional single knob control device may be a valve that regulates the vacuum sent to various cylinders for the proper positioning of the air dampers of the system and also the water valve for heating and the thermostat for cooling. Inasmuch as the water valve and thermostat require graduated control, simple cylinders will not suffice as is the case with the dampers, and expensive modulating devices must be incorporated therein. Other single knob control devices are of a purely mechanical nature and produce the necessary operations by being rotatable and movable laterally and axially. The mechnical type control device is generally more adaptable to automotive heating systems exclusively, due to the limited number of components therefor.

SUMMARY OF THE INVENTION

Applicant's single knob control device is designed to utilize preferably a vacuum valve for the positioning of the numerous dampers of the air conditioning system which can be either in the open or closed positions and the mechanical construction of the device adapted for the selective graduated control of either the water valve or the thermostat by use of a slotted mounting arrangement. It is to be understood, however, that the blending damper of a "blend air system" could be substituted for the conventional water valve to secure comparable heating performance. Applicant's control device is semi-automatic in nature since no single temperature is selected which will cause the automatic operation of either the heating or cooling aspects of the system to maintain the selected temperature. Needless to say, automatic systems are extremely costly to construct and maintain.

While conceivably various designs could be developed to perform all the functions of applicant's control device, it is felt that applicant has provided a unique device that solves the problem of a multiplicity of control levers in a particularly economical fashion.

It is, therefore, an object of this invention to provide a new and improved single knob air conditioning control device for a vehicle.

Another object of this invention is to provide a single knob control device that mechanically achieves selective graduated control of the heating or cooling media while incorporating a valve to suitably position the air dampers of a vehicle air conditioning system.

BRIEF DESCRIPTION OF THE DRAWINGS

FIGURE 1 is a plan view of an automative air conditioning system that incorporates the single knob control device of this invention, the details of the system are shown somewhat schematically as they do not form a part of this invention;

FIGURE 2 is an enlarged side view of the evaporator housing of the system taken along line 2—2 of FIGURE 1;

FIGURE 3 is an enlarged side view of the heater housing of the system taken along line 3—3 of FIGURE 1;

FIGURE 4 is an enlarged plan view of the single knob control device of this invention;

FIGURE 5 is a side view of the control device;

FIGURE 6 is a section taken along line 6—6 of FIGURE 4;

FIGURE 7 is a side view of the valve body of the control device; and

FIGURE 8 is a plan view of the valve body of the control device.

DESCRIPTION OF THE PREFERRED EMBODIMENT

Referring to FIGURE 1, 10 indicates an air conditioning system for an automotive type vehicle 11. System 10 includes a blower housing 12 that may be mounted in the engine area of vehicle 11 due to space limitations. Blower housing 12 has blower 14 mounted therein and water valve 15 mounted on its external surface. Valve 15 has an inlet 16 adapted to be connected to the vehicle engine (not shown) and an outlet 17 to the heater core 18. Valve 15 controls the flow of engine coolant to heater core 18 located in heater housing 19 which is in the passenger area of vehicle 11 and in communication with blower housing 12. Valve 15 also has a control arm 20 which is adapted to be connected to system control device 21. It is to be noted that a "blending damper" of a "blend air system" could be substituted for water valve 15.

Evaporator housing 22 of the refrigeration portion of system 10 is located in the passenger compartment of vehicle 11 and is also in communication with blower housing 12. Air flow from the vehicle cowl (not shown) in the system 10 is in the direction shown by the arrows. Evaporator housing 22 has evaporator core 24 located therein, and thermostat 25 mounted on its external surface. Thermostat 25 has arm 26 which is adapted to be connected to control device 21. Setting of the thermostat regulates the operation of the refrigeration portion of system 10. The details of the refrigeration portion are not shown as they are conventional and form no part of this invention. Similarly the manually operated outlets for the cooled air are not shown.

The air dampers of system 10 and the associated actuators are best shown in FIGURES 2 and 3. FIGURE 3 discloses outside air and recirculation damper 28 mounted in heater housing 19. Double acting vacuum cylinder 29 has piston rod 30 connected to crank arm 31 of damper 28. Cylinder 29 has ports 32 and 34 which are adapted to be connected to control device 21 by suitable conduits (not shown.) Damper 28 in one position allows the outside air coming into the vehicle 11 through heater core 18 to pass into the blower housing 12 and then back into the vehicle 11 via the evaporator housing 22. In the closed or recirculation position (shown in broken lines), outside air is cut off and the blower brings vehicle air into the blower housing and then back into the evaporator housing past the evaporator core for cooling and into the vehicle by means of passage 33, shown in FIGURE 2. Spring 34a maintains damper 28 in a closed condition when its vacuum is released from the cylinder 29.

FIGURE 2 discloses the dampers of the evaporator housing 22. Defrost damper 35 is located near the top of housing 22 and controls the flow of air to the conventional windshield defrost system (not shown) via passage 35a. Vacuum cylinder 36 is a single acting cylinder with a built-in spring return. Cylinder 36 has port 38 adapted to be connected to control device 21 and rod 39 connected to crank arm 40 of damper 35 for actuation thereof. The spring return of cylinder 36 moves damper 35 to the closed position upon withdrawal of vacuum pressure. Heating damper 41 is located near the bottom of evaporator housing 22 and controls the flow of heated air to the passenger compartment via passage 41a in housing 22. Cylinder 42 is similar in construction to cylinder 36 and has rod 44 for connection to crank arm 45 or damper 41 for actuation thereof. Cylinder 42 has port 46 adapted to be connected to control device 21. Damper 41 is normally in the closed position. Suitable vents in control device 21 release the vacuum and allow the springs of cylinders 36 and 42 to close dampers 35 and 41 upon proper positioning of the operating knob of control device 21.

As best shown in FIGURES 4 through 8, control device 21 preferably consists of a modified vacuum valve 48 mounted on a base plate 49. Base plate 49 has a pair of arcuate slotted openings 50 and 51 therethrough and a slotted passage 52. Base plate 49 also has a pair of clamp-like clips 54 and 55 mounted thereon and a mounting pad 56 for a plate mounted manual, three speed electric switch 58 for blower 14. Plate 49 also has an upstanding flange 59 having a slotted aperture 60 therethrough and holes (not shown) for mounting control device 21 in a vehicle instrument panel by means of capscrews or the like.

Valve 48 consists of a valve body 61 and a valve cover 62 connected by rivet 64 and spring washer 65 for rotary motion therebetween. Valve body 61 has a post-like projection 66 extending therefrom and into passage 52 when valve 48 is mounted on base plate 49. Projection 66 restrains rotary movement of body 61 upon rotary movement of valve cover 62 relative thereto. Valve body 61 also has a plurality of generally circular grooves 68, 69 and 70 for vacuum passage therethrough. Groove 70 has a hole 71 through valve body 61 to vent the groove to the atmosphere.

Valve cover 62 has a pair of earlike portions 72 and 74 extending therefrom. Ear 72 (see FIGURE 6) is slidably mounted on base plate 49 by rivet 75 extending through slotted opening 50. Washer 76, step washer 77 in conjunction with shoulder 78 maintains ear 72 in contact with base plate 49 during travel of valve 48 relative to the base plate. Ear 74 is similarly connected to base plate 49 by means of slotted opening 51 in conjunction with rivet 79. Rivet 75 is connected to Bowden cable assembly 80 which consists of the wire 81 and the sheath 82 of the assembly. The sheath 82 is clamped in clip 55 to base plate 49 which provides a support therefor. The other end of Bowden cable assembly 80 is connected to control arm 26 of thermostat 25. Bowden cable assembly 84 consisting of wire 85 and sheath 86 is similarly connected to rivet 79 and extends through clip 54 mounted on plate 49 to connect to arm 20 of water valve 15.

Valve cover 62 has a plurality of ports extending therethrough and aligned with the grooves 68, 69 and 70. Port 88 is adapted to be connected via a suitable conduit (not shown) to a source of vacuum (not shown), and port 89 to port 46 of cylinder 42 to actuate damper 41. Port 90 is adapted to be connected to port 34 of cylinder 29 and port 91 to port 32 to actuate damper 28. Port 92 is adapted to be connected to port 38 of cylinder 36 to actuate damper 35. Port 94 provides a vent to the atmosphere of valve 48.

Valve cover 62 of valve 48 has a knob 95 extending therefrom. Knob 95 is constructed to be moved by the vehicle operator laterally in either direction in slotted aperture 60 from the central "off" position noted in FIGURE 4. As shown in FIGURE 4, knob 95 when moved to the right actuates the heating portion of system 10. Further movement actuates the defrosting portion of system 10 while movement in the opposite direction actuates the cooling portion. Although not shown, a defrosting portion could be provided in conjunction with the cooling portion. Similarly, defrosting could be provided with knob 95 slightly past the "off position" without actuating either the heating or cooling portions of system 10.

In operation, if the vehicle operator desires heat, knob 95 and thus cover 62 is moved from the "off position" toward the "hotter position." As the "hotter position" is approached port 88 is aligned with groove 69 of rotatably fixed body 61 and vacuum is applied thereto and via the radially inner portion of groove 69 to port 89 which applies vacuum to the associated port 46 of cylinder 42 to open heat damper 41. Vacuum applied to groove 69 also via port 90 is applied to the associated port 34 of cylinder 29 to open fresh air damper 28. Simultaneously with movement of knob 95, ear 74 via rivet 79 moves down slotted opening 51 and pulls Bowden cable assembly 84 attached to arm 20 of water valve 15 to progressively open same. Further movement of knob 95 opens water valve 15 until same is in the completely open position for maximum heat. As knob 95 is moved on and into the defrost position, port 92 which has been aligned with groove 70 which is vented to the atmosphere by hole 71, now becomes aligned with groove 69 and vacuum is applied thereto. Vacuum is thus applied to associated port 38 of cylinder 36 to open defrost damper 35. A suitable overlap is provided so that heater damper 41 remains open along with defrost damper 35 until port 89 is aligned with groove 70 and is vented to the atmosphere by hole 71. Upon being vented to the atmosphere, the spring of cylinder 42 closes heat damper 41. Similarly by a suitable overlap, as knob 95 is moved back toward the heat position, defrost damper 35 remains open while port 89 again becomes aligned with groove 69 to open heat damper 41. When knob 95 is returned to the off position port 92 is aligned with groove 70 and is vented and spring loaded cylinder 36 closes defrost damper 35. Upon port 88 being moved out of alignment with groove 69, the vacuum remaining in the system is dissipated via vent port 94 and an external spring 34a closes fresh air damper 28 and the built in spring of cylinder 42 closes heating damper 41.

If it is desired to cool vehicle 11, knob 95 is moved from the "off position" by the operator to the "colder position." Port 88 then is aligned with groove 68 and port 91 is also aligned with the inner portion of groove 68. Vacuum is therefore applied to associated port 32 of cylinder 29 to move damper 28 to the closed or recirculation position. Continued movement of knob 95 via rivet 75 moves Bowden cable assembly 80 and attached arm 26 of thermostat 25 to set same to a lower temperature and actuate the refrigeration portion of the system. Further movement of knob 95 sets thermostat 25 for the lowest temperature to provide maximum cooling. Also as mentioned previously, defrosting could be provided with cooling by suitable construction of valve 48. Upon moving knob 95 from the maximum colder position back to the "off position," source port 88 is moved out of alignment with groove 68. No vent need be provided for groove 68 as damper 29 is already in the closed position. By leaving knob 95 in "off position" the vacuum in groove 68 will gradually dissipate. Should heating be immediately desired, moving knob 95 to the "heat position" will align vent port 94 with groove 68 and vent same and therefore cylinder 29 while also applying a vacuum to the other side of the cylinder via groove 69 to again open fresh air damper 28.

From the foregoing, it is readily apparent that applicant's unique control device permits the vehicle operator to heat, cool or defrost the vehicle solely by movement of the single knob of the device except for blower operation.

What is claimed is:
1. A single knob control device for an automotive air conditioning system comprising:
   (a) a base plate having a pair of slotted openings and a slotted passage therethrough;
   (b) a valve having a projection extending into said passage for movement therein and a pair of ear-like portions slidably mounting said valve to said base plate via said slotted openings, one of said ears being adapted to be connected to a heating means and the other ear to a cooling means of an automotive air conditioning system to provide selective graduated control thereof upon movement of said valve in relation to said slotted openings, said valve also having a plurality of ports adapted to be connected to a fluid source and to actuators for movement of the dampers of the system, said valve having a knob extending therefrom for movement of said knob and therefore said valve by the automobile operator to actuate the heating or cooling means while also positioning the associated dampers.
2. The device of claim 1 in which the slotted openings of the base plate are generally of arcuate configuration.
3. The device of claim 2 further comprising:
   a first Bowden cable assembly connected to said one ear to connect said one ear to a heating means and a second Bowden cable assembly connected to said other ear to connect said other ear to a cooling means.
4. The device of claim 3 further comprising:
   a cable sheath clip mounted on said base plate for each Bowden cable assembly to provide a support therefor.
5. The device of claim 4 in which said base plate has a flange with a slotted aperture and said knob extends through said aperture for movement therein, said aperture serving as a support for said knob by preventing movement in a direction opposite the length of the slotted aperture and further comprising:
   an electric switch mounted on said base plate for system blower operation.
6. A single knob control device for an automotive air conditioning system comprising:
   (a) a base plate having a pair of slotted openings and a slotted passage therethrough;
   (b) a vacuum valve having a body and a cover movably connected therebetween, said cover having a pair of ear-like portions slidably mounting said valve to said base plate via said slotted openings, one of said ears being adapted to be connected to a heating means and the other ear to a cooling means of an automotive air conditioning system to provide selective graduated control thereof upon movement of said valve in relation to said slotted openings, said cover also having a knob extending therefrom for movement of said knob and therefore said valve by the automobile operator, said body having a projection extending into said passage for movement therein, said body also having a plurality of grooves therein, said grooves being aligned with a plurality of ports in said valve cover, one port being adapted to be connected to a vacuum source and other ports being adapted to be connected to actuators for dampers of the system, movement of the knob and therefore said cover by the automobile operator actuating the heating or cooling means while also positioning the associated dampers.
7. The device of claim 6 in which the valve cover is rotatably connected to said valve body and said grooves of said body are of generally circular configuration.
8. The device of claim 7 in which the slotted openings of the base plate are of generally arcuate configuration and at least one of said grooves is vented to the atmosphere.
9. The device of claim 8 further comprising:
   a first Bowden cable assembly connected to said one ear to connect said one ear to a heating means and a second Bowden cable assembly connected to said other ear to connect said other ear to a cooling means.
10. The device of claim 9 further comprising:
    a cable sheath clip mounted on said base plate for each Bowden cable assembly to provide a support therefor and an electric switch mounted on said base plate for system blower operation.

References Cited

UNITED STATES PATENTS

| 2,087,635 | 7/1937 | Backe et al. | 137—625.42 |
| 3,263,739 | 8/1966 | Gaskill et al. | 165—44 |
| 3,428,115 | 2/1969 | Caldwell | 165—23 |

ROBERT A. O'LEARY, Primary Examiner

CHARLES SUKALO, Assistant Examiner

U.S. Cl. X.R.

137—625.42; 165—96, 126